United States Patent
Kajita et al.

(10) Patent No.: US 7,817,226 B2
(45) Date of Patent: Oct. 19, 2010

(54) LIQUID CRYSTAL DISPLAY DEVICE

(75) Inventors: Daisuke Kajita, Hitachi (JP); Ikuo Hiyama, Hitachinaka (JP); Shintaro Takeda, Hitachi (JP)

(73) Assignee: Hitachi Displays, Ltd., Chiba (JP)

( * ) Notice: Subject to any disclaimer, the term of this patent is extended or adjusted under 35 U.S.C. 154(b) by 172 days.

(21) Appl. No.: 12/019,031

(22) Filed: Jan. 24, 2008

(65) Prior Publication Data

US 2008/0192182 A1   Aug. 14, 2008

(30) Foreign Application Priority Data

Feb. 9, 2007   (JP)   ................. 2007-029940

(51) Int. Cl.
*G02F 1/1335* (2006.01)
*C09K 19/02* (2006.01)

(52) U.S. Cl. .................... 349/96; 349/181

(58) Field of Classification Search ........... 349/96, 349/181
See application file for complete search history.

(56) References Cited

U.S. PATENT DOCUMENTS

| 6,396,556 | B1 | 5/2002 | Watanabe | |
|---|---|---|---|---|
| 7,072,009 | B2 * | 7/2006 | Joten | 349/96 |
| 7,084,947 | B2 * | 8/2006 | Miyachi et al. | 349/129 |
| 7,609,346 | B2 * | 10/2009 | Joten | 349/117 |
| 2005/0052591 | A1 * | 3/2005 | Joten | 349/98 |
| 2005/0206817 | A1 * | 9/2005 | Kajita et al. | 349/119 |
| 2006/0050215 | A1 * | 3/2006 | Haruyama | 349/117 |
| 2006/0055845 | A1 * | 3/2006 | Hisatake | 349/98 |
| 2006/0170848 | A1 * | 8/2006 | Kawai et al. | 349/117 |
| 2006/0203162 | A1 * | 9/2006 | Ito et al. | 349/117 |
| 2006/0215092 | A1 * | 9/2006 | Sato et al. | 349/117 |
| 2007/0126960 | A1 * | 6/2007 | Joten | 349/117 |

(Continued)

FOREIGN PATENT DOCUMENTS

CN   1245906   3/2000

(Continued)

OTHER PUBLICATIONS

Harry J. Coles, "Liquid crystal 'blue-phases' with a wide temperature range", Nature, vol. 436, pp. 997-1000 (Aug. 2005).

(Continued)

*Primary Examiner*—K. Cyrus Kianni
(74) *Attorney, Agent, or Firm*—Antonelli, Terry, Stout & Kraus, LLP.

(57) ABSTRACT

A liquid crystal display device comprises: a first substrate having a first polarization layer on a light incident side; a second substrate having a second polarization layer on a light outgoing side; a liquid crystal layer disposed between the first and the second substrates; a first birefringent film disposed between the first and the second polarization layers; a second birefringent film disposed between the first birefringent film and the second polarization layer; and wherein the liquid crystal layer has a property that a refractive index anisotropy is induced in it by an electric field applied between the pixel electrodes and the common electrode; wherein in-plane retarded phase axes of the first and the second birefringent films form an angle of from 88 degrees to 92 degrees with the first polarization layer; wherein the first birefringent films have Nz coefficients greater than 0.5 and smaller than 0.5, respectively.

8 Claims, 13 Drawing Sheets

U.S. PATENT DOCUMENTS

2007/0165165 A1\* 7/2007 Joten .......................... 349/119

FOREIGN PATENT DOCUMENTS

CN 1645205 7/2005
JP 2006-003840 1/2006

OTHER PUBLICATIONS

B. R. Acharya, et al., "The Bent-Core Biaxial Nematic Phase", Liquid Crystal Today, vol. 13. No. 1, pp. 1-4 (Mar. 2004).

D. W. Berreman, "Optical in Stratified and Anisotropic Media: 4×4-Matrix Formulation" J. Opt. Soc. Am. vol. 62, No. 4, pp. 502-510, Apr. 1972.

"Crystal Optics" compiled by the Society of Applied Physics, Optics Meeting and published by Morikita Shuppan K.K., 1984, 4th impression of 1st edition, 5th chapter p. 102-p. 163.

Y. Saitoh, "Optimum Film Compensation of Viewing Angle of Contrast in In-Plane-Switching-Mode Liquid Crystal Display," Jpn. J. Appl. Phys. Vo.I37, pp. 4822-4828, Sep. 1998.

\* cited by examiner

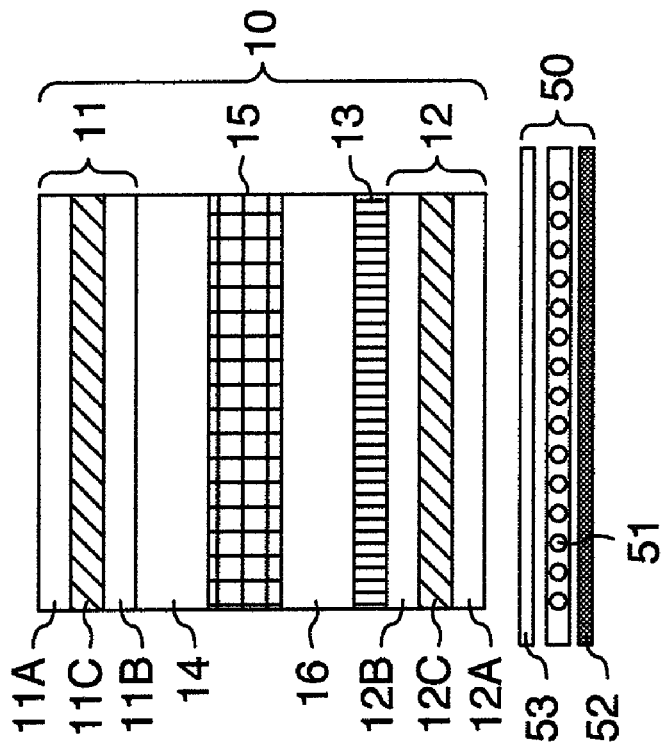
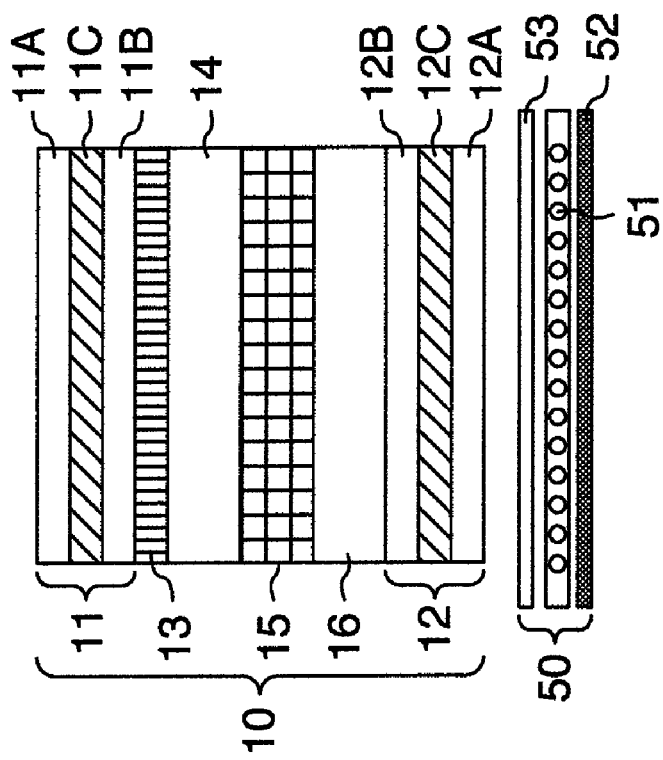

$S1 = \cos La \cos Lo$
$S2 = \cos La \sin Lo$
$S3 = \sin La$ $S1 = \langle |Ex|^2 \rangle - \langle |Ey|^2 \rangle$
$S2 = \langle 2ExEy\cos \delta \rangle$
$S3 = \langle 2ExEy\sin \delta \rangle$
$\delta = \phi y - \phi x$

FIG.8
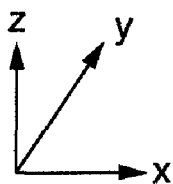
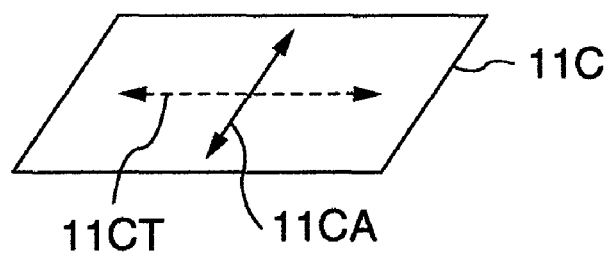
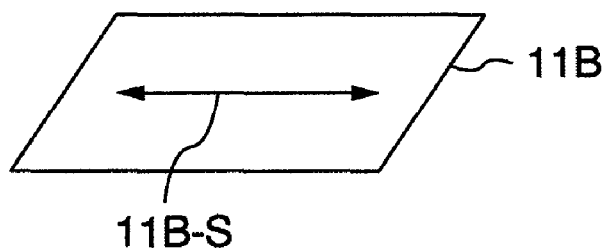
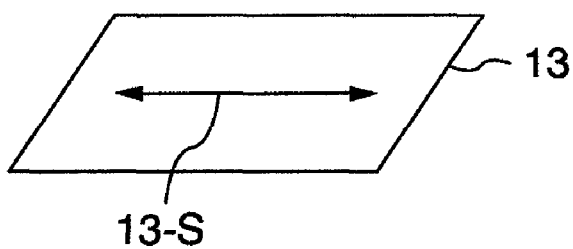
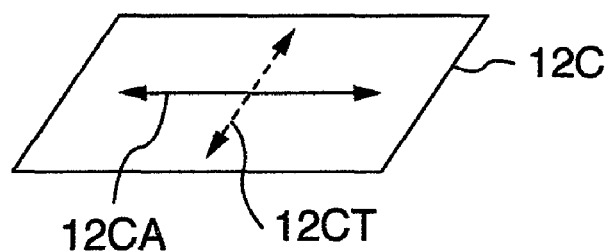

FIG.13
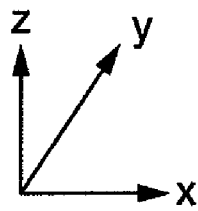
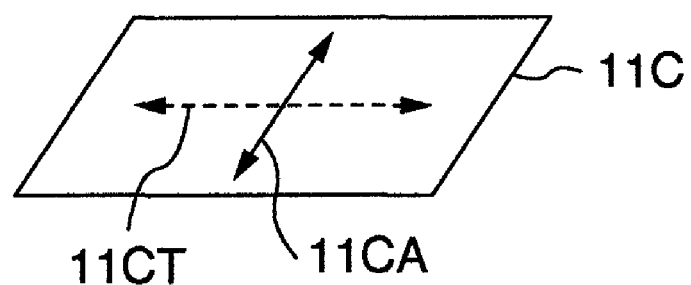
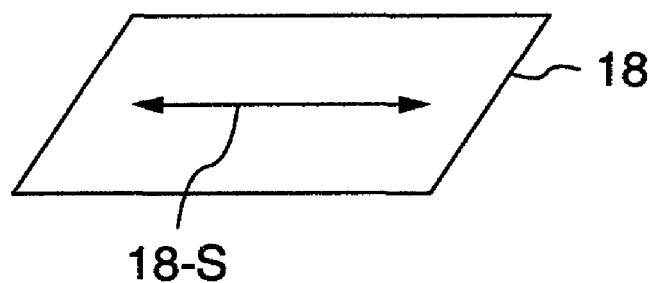
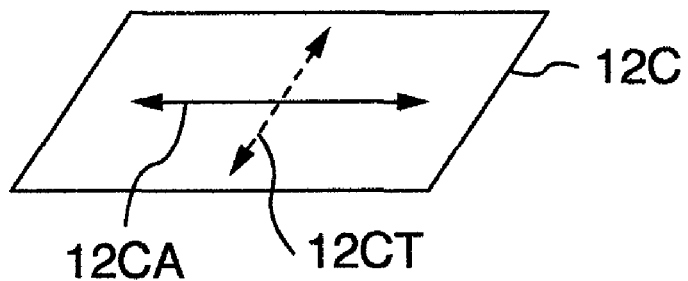

LIQUID CRYSTAL DISPLAY DEVICE

BACKGROUND OF THE INVENTION

The present invention relates to a liquid crystal display device and a liquid crystal panel and more specifically to significant improvements in a viewing angle characteristic of the liquid crystal display device that controls transmission and cutoff of light by applying an electric field to a liquid crystal layer having three-dimensional optical isotropy.

Among liquid crystal display methods to improve contrast and viewing angle characteristic of a twisted nematic (TN) display system, there have been known an in-plane switching (horizontal electric field) display method (hereinafter referred to as an "IPS method") and a multi-domain vertical alignment display method (hereinafter referred to as a "VA method"). These methods are able to make substantial improvements in viewing angle and contrast over the TN display method.

However, in the IPS and VA methods since the liquid crystal layer is an optically uniaxial medium, if it is used as is, its transmissivity will have a dependency on the viewing angle. Further, the nematic liquid crystal material exhibits light scattering caused by thermal fluctuations of their molecules. In the IPS and VA methods the nematic liquid crystal material enters a black mode when applied with no voltage. So even in the black mode, degradations in contrast due to light leakage caused by scattering are theoretically unavoidable. These problems of optical anisotropy and light scattering are unique to the display devices using the nematic liquid crystal material.

Under these circumstances, a liquid crystal material with an optically three- or two-dimensional isotropy (hereinafter referred to as an "isotropic liquid crystal") has come to be known in recent years. This isotropic liquid crystal exhibits a characteristics that, when no voltage is applied to the liquid crystal layer, the alignment of the liquid crystal molecules is optically three- or two-dimensionally isotropic and that when a voltage is applied, a birefringence is induced in the voltage application direction. Isotropic liquid crystal materials reported in recent years that have three-dimensional isotropy are smectic blue phase and cholesteric blue phase liquid crystals. Isotropic liquid crystal materials with two-dimensional isotropy are bent type liquid crystal molecules having a so-called bent-core structure. The bent-core structure means a liquid crystal compound aligned vertical to a substrate and exhibits an isotropy in a plane of the liquid crystal layer when no voltage is applied. Other liquid crystal materials known include cubic phase, smectic Q phase, micellar phase and sponge phase liquid crystals.

Harry J. Coles, Nature, Vol. 436, pp. 997-1000 (2005), describes an increased temperature range of the blue phase which has been very narrow in temperature range and difficult to put into practical use with devices. B. R. Acharya, et al., Liquid Crystal Today, Vol. 13. No. 1, pp. 1-4 (2004), describe isotropic liquid crystal materials and their properties in connection with an optical biaxiality of the bent-core structure.

Further JP-A-2006-3840 discloses detailed electrode structures of liquid crystal panels using isotropic liquid crystals.

SUMMARY OF THE INVENTION

As described above, the isotropic liquid crystals have come to be known to have properties different from those of conventional liquid crystals. The above-cited publications, however, do not consider a problem of viewing angle characteristic that may arise when the three-dimensional optically isotropic liquid crystals are actually applied to display devices.

Our studies have found that an application of the blue phase to display devices gives rise to the following problems although it has advantages in terms of image quality such as a good contrast ratio (hereinafter referred to as a CR ratio) when viewed from the front, a good grayscale characteristic when viewed at an oblique angle and a good viewing angle characteristic at high grayscale levels. The problems include a significant light leakage when viewed at an oblique angle during the black mode, which in turn results in a reduction in CR ratio when viewed at an oblique angle and a deteriorated color reproduction at low grayscale levels when viewed at an oblique angle.

A problem this invention intends to solve is that, in a liquid crystal display device that applies an electric field to a liquid crystal layer having a three-dimensional optical isotropy to control light transmission and cutoff, the brightness increases when the liquid crystal display is viewed at an oblique angle in the black mode.

The invention of this application can be accomplished by, for example, the following means.

According to one aspect of the present invention, there is provided a liquid crystal display device which comprises a first substrate having a first polarization layer on a light incident side; a second substrate having a second polarization layer on a light outgoing side; a liquid crystal layer disposed between the first substrate and the second substrate; a first birefringent film disposed between the first polarization layer and the second polarization layer; a second birefringent film disposed between the first birefringent film and the second polarization layer; and pixel electrodes and a common electrode arranged on one of the first substrate and the second substrate; wherein an absorbing axis of the first polarization layer and an absorbing axis of the second polarization layer form an angle of from 88 degrees to 92 degrees; wherein the liquid crystal layer has a property that a refractive index anisotropy is induced in it by an electric field applied from the pixel electrodes and the common electrode; wherein in-plane retarded phase axes of the first birefringent film and the second birefringent film form an angle of from 88 degrees to 92 degrees with the first polarization layer; wherein the first birefringent film has an Nz coefficient greater than 0.5 and the second birefringent film has an Nz coefficient smaller than 0.5.

The "birefringent film" refers to an optical phase compensation film to be explained later or an optically anisotropic support member (e.g., a support member using TAC). A birefringent film on a light source side is defined to be a first birefringent film and another birefringent film on the far side is defined to be a second birefringent film. Their detailed construction will be described later. The "angle of from 88 degrees to 92 degrees" is intended to mean that the directions of the two axes are almost at right angles. ±2 degrees is taken as an error range for the angle in which the effects of this invention are considered achievable.

According to another aspect of this invention, there is provided a liquid crystal display device which comprises: a first substrate having a first polarization layer on a light incident side; a second substrate having a second polarization layer on a light outgoing side; a liquid crystal layer disposed between the first substrate and the second substrate; a first birefringent film disposed between the first polarization layer and the second polarization layer; a second birefringent film disposed between the first birefringent film and the second polarization layer; and pixel electrodes and a common electrode arranged on one of the first substrate and the second substrate; wherein an absorbing axis of the first polarization layer and an absorbing axis of the second polarization layer form an angle of from 88 degrees to 92 degrees; wherein the liquid crystal layer has a property that a refractive index anisotropy is induced in it by an electric field applied from the pixel electrodes and the common electrode; wherein in-plane retarded phase axes of the first birefringent film and the second birefringent film form an angle of from −2 degrees to 2 degrees with the first polarization layer; wherein the first birefringent film has an Nz coefficient smaller than 0.5 and the second birefringent film has an Nz coefficient greater than 0.5.

The "angle of from −2 degrees to 2 degrees" is intended to mean that the directions of the two axes are almost parallel to each other. ±2 degrees is taken as an error range for the angle in which the effects of this invention are considered achievable.

In the above construction, the first birefringent film and the second birefringent film are arranged on one of the first substrate and the second substrate.

In the above construction, the first birefringent film is arranged over the first substrate and the second birefringent film is arranged over the second substrate.

In the above construction, at least one of the first birefringent film and the second birefringent film constitutes a support member for the first polarization layer and the second polarization layer.

In the above construction, the liquid crystal layer has equal refractive indices in three dimensions when no voltage is applied.

In the above construction, the first birefringent film consists of triacetylcellulose.

In the above construction, at least one of the first birefringent medium and the second birefringent medium is anisotropic monoaxis medium.

In the above construction, the pixel electrodes and the common electrode are arranged over the first substrate and are both formed in a comb shape.

In the above construction, the pixel electrodes and the common electrode are arranged over the first substrate, and one of the pixel electrodes and the common electrode is formed in a comb shape and the other is formed in a tabular shape.

According to the present invention, it is possible to realize a brightness reduction at an oblique viewing angle during black mode. This in turn allows for the realization of a liquid crystal display device which has a high CR ratio when viewed from the front, an improved tonality when viewed at an oblique viewing angle and a high CR ratio when viewed at an oblique viewing angle.

Other objects, features and advantages of the invention will become apparent from the following description of the embodiments of the invention taken in conjunction with the accompanying drawings.

BRIEF DESCRIPTION OF THE DRAWINGS

FIG. 1A shows a construction of a liquid crystal display device as one embodiment of this invention.

FIG. 1B shows a construction of a liquid crystal display device as one embodiment of this invention.

FIG. 8 is an optical configuration diagram for the liquid crystal display device of this invention.

FIG. 13 is an optical configuration diagram for the liquid crystal display device of this invention.

DETAILED DESCRIPTION OF THE EMBODIMENTS

Now, examples of the present invention will be described in detail.

In a non-selfluminous liquid crystal display used in liquid crystal televisions that are becoming increasingly popular, it is important to pass as much light from an illuminating device or backlight assembly during a white mode and to cut off as much light in a black mode as possible. In a liquid crystal display device that applies a liquid crystal having a three-dimensional optical isotropy, this invention concerns a reduction in luminance of the liquid crystal when viewed at an oblique angle in a black mode.

Figure 2:
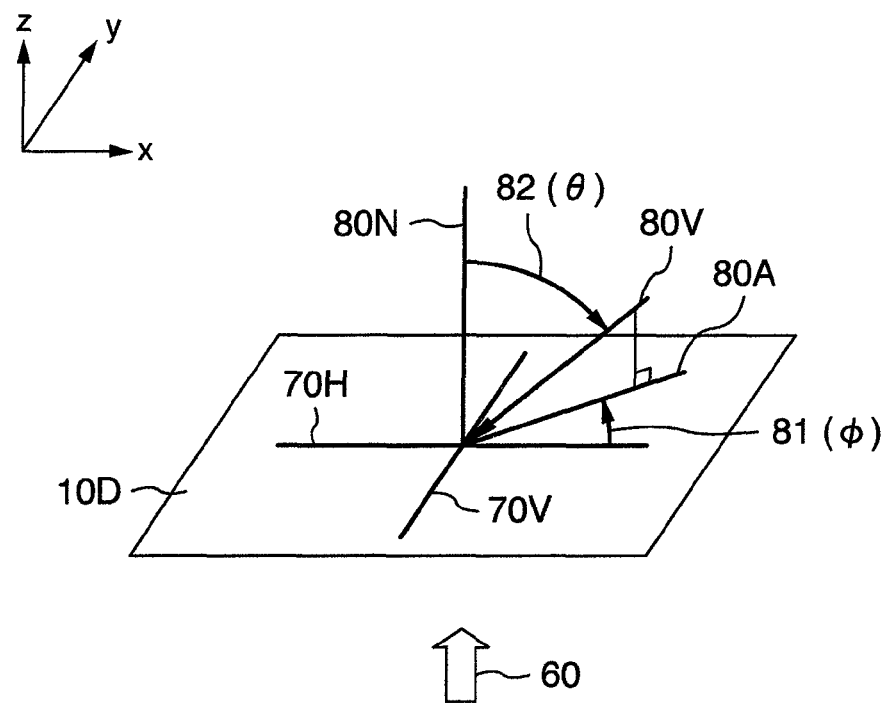
FIG. 2 is a definition diagram for explanation of the liquid crystal display device of this invention.

First, a factor that causes an increase in brightness when a liquid crystal panel is seen at an oblique angle during a black mode, will be explained. FIG. 2 shows a definition of a coordinate system. When a beam of light 60 emitted from an illumination device passes through the liquid crystal panel, the beam is modulated by a liquid crystal. The modulated beam as it leaves a display surface 10D is defined in the coordinated system as follows. A direction normal to the display surface 10D is designated 80N, a horizontal direction on the display surface 70H, a vertical direction on the display surface 70V and a viewing direction 80V. Also let a viewing angle 82 be θ and a projected direction on the display surface 10D of the viewing direction 80V be 80A. An angle formed by the projected viewing direction 80A and the horizontal direction on the display surface 70H is taken as an azimuth angle 81 and represented by Φ. Unless otherwise specifically stated, the xyz coordinates are set as shown in the figure.

Figure 3A:
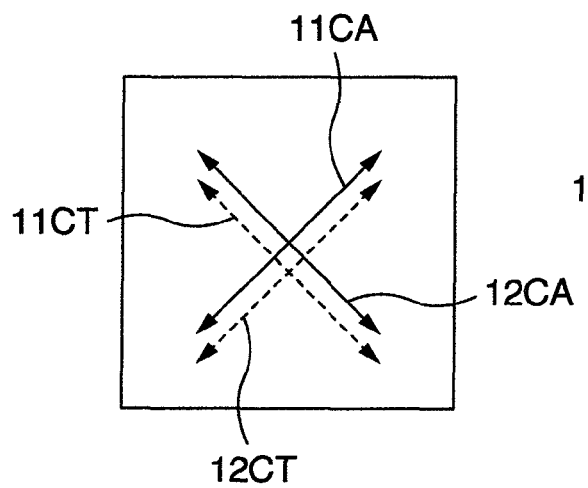
FIG. 3A is a conceptual diagram for explanation of the liquid crystal display device of this invention.
Figure 3B:
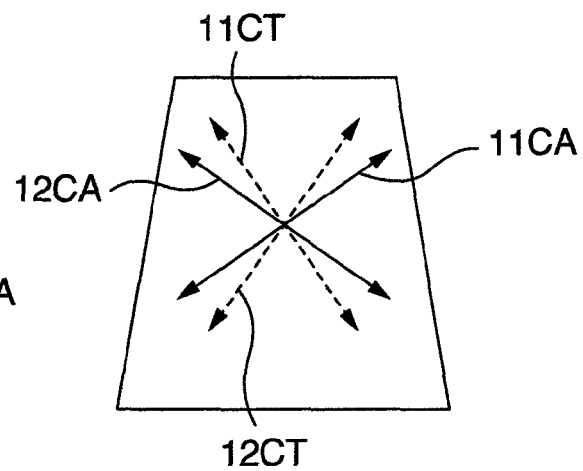
FIG. 3B is another conceptual diagram for explanation of the liquid crystal display device of this invention.

Next, in a pair of orthogonal polarizing plates, the causes for light leakage will be discussed by assuming that the viewing angle θ and the azimuth angle Φ are θ≠0° and Φ≠0°, 180°, ±90°. As shown in FIG. 3A, with absorbing axes 11CA, 12CA (or transmission axes 11CT, 12CT) of the two polarizing plates set perpendicular to each other, incident light from a direction normal to the polarizing plates is linearly polarized by the polarizing plate on the incident side and is absorbed by the polarizing plate on the outgoing light side to enter into a black mode. When the liquid crystal panel is viewed at an oblique angle, as shown in FIG. 3B (θ≠0°, Φ≠0°, 180°, ±90°), the light has a component parallel to the transmission axis of the opposite polarizing plate and thus cannot be cut off completely by the opposite polarizing plate, resulting in a light leakage. Although the blue phase does not need to take the influences of the liquid crystal layer into consideration since it is optically isotropic when no voltage is applied, the viewing angle characteristic of the polarizing plates must be considered because, if not taken into account, it will result in a light leakage in a black mode when the liquid crystal panel is viewed at an oblique angle.

For understanding of the phenomenon, the Poincare sphere representation is very useful. In a simple system where a light is incident at right angles on a birefringent medium, a method of describing a change in polarization by using the Poincare sphere is disclosed in, for example, "Crystal Optics" compiled by the Society of Applied Physics, Optics Meeting and published by Morikita Shuppan K. K., 1984, 4th impression of 1st edition, 5th chapter p 102-p 163. Stokes parameters S0, S1, S2, S3 are expressed in the following equations, where x and y axes are on a plane perpendicular to the direction of light, Ex and Ey are the electric field amplitudes of light, and δ (=δy−δx) is a relative phase difference between Ex and Ey.

$$S0 = <|Ex|^2> + <|Ey|^2>$$

$$S1 = <|Ex|^2> - <|Ey|^2>$$

$$S2 = <2Ex \cdot Ey \cdot \cos \delta>$$

$$S3 = <2Ex \cdot Ey \cdot \sin \delta> \quad (1)$$

Figure 4:
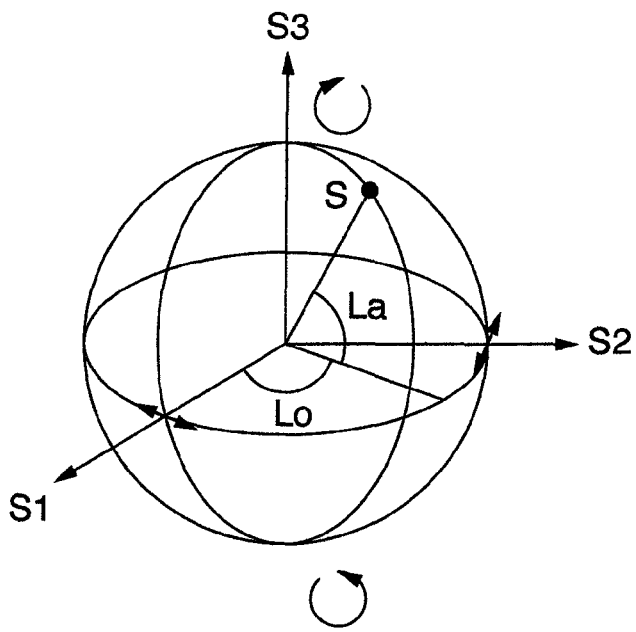
FIG. 4 is a general Poincare sphere representation for explanation of the liquid crystal display device of this invention.

In the case of complete polarization, these parameters have the following relationship: $S0^2 = S1^2 + S2^2 + S3^2$. When represented on the Poincare sphere, they are as shown in FIG. 4. The parameters S1, S2, S3 are put on respective axes of a spatial orthogonal coordinate system and a point S representing the state of polarization is situated on a sphere with a radius of intensity S0. If a point of polarization state S is expressed by a latitude La and a longitude Lo, since $S0^2 = S1^2 + S2^2 + S3^2$ in the case of complete polarization, the parameters can be expressed as follows by considering a sphere with a radius of 1.

$$S1 = \cos La \cdot \cos Lo$$

$$S2 = \cos La \cdot \sin Lo$$

$$S3 = \cos La \quad (2)$$

Here, on the Poincare sphere, a clockwise polarization is arranged in an upper hemisphere, a counterclockwise polarization in a lower hemisphere, a linear polarization on the equator, and right- and left-handed circular polarizations in the north and south poles, respectively.

Figure 5A:
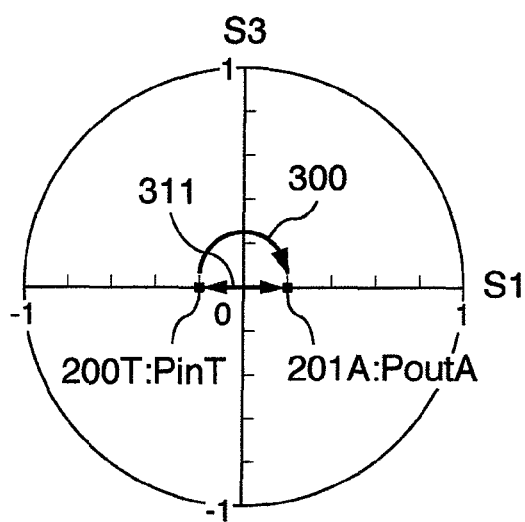
FIG. 5A is a Poincare sphere representation for explanation of the liquid crystal display device of this invention.
Figure 5B:
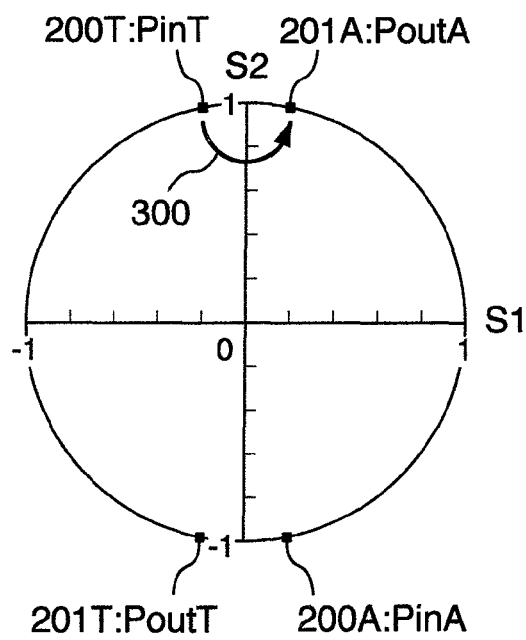
FIG. 5B is a Poincare sphere representation for explanation of the liquid crystal display device of this invention.

If we consider the states of FIGS. 3A and 3B on the Poincare sphere, they are represented as shown in FIGS. 5A and 5B. For an azimuth angle Φ=45° and θ=60°, FIG. 5B shows a projection of the direction onto a S1-S2 plane and FIG. 5A shows a projection onto a S1-S3 plane. The polarization state of the transmission axis 12CT of the light incident side polarization plate is represented by 200T; the linear polarization having a polarization component on the absorbing axis 12CA is represented by 200A; the polarization state of the transmission axis 11CT of the light outgoing side polarization plate is represented by 201T; and the linear polarization having a polarization component on the absorbing axis 11CA is represented by 201A. That is, a distance 311 between 200T and 201A indicates a light leakage. Therefore, the light leakage can be eliminated by performing a transformation 300 of the polarization state of 200T into that of 201A.

Any change in polarization state on the Poincare sphere can be represented by the rotary transformation about a certain axis on the equator. Our study has found that a change in polarization state on the Poincare sphere before and after the transmission through a general 2-axis anisotropic medium with its refractive indices nx, ny, nz in xyz directions all differing from one another is determined by a retardation And (nx, ny, nz, ϕ, θ) when viewed at an oblique angle and by a coefficient Nz. The retardation And (nx, ny, nz, ϕ, θ) when viewed at an oblique angle determines a rotation angle of the rotary transformation, and the coefficient Nz determines the rotation axis. The coefficient Nz is expressed by the following equation.

$$Nz = (nx - nz)/(nx - ny) \quad (3)$$

FIG. 1 shows a basic construction of a liquid crystal display device.

The liquid crystal display device has a first substrate 16 having a first polarization layer 12C on the light incident side, and a second substrate 14 having a second polarization layer 11C on the light outgoing side. Here, the absorbing axes of the first and second substrate are arranged almost at right angles to each other (with a smaller angle being 88-90°).

On both sides of the first polarization layer 12C there are arranged support members 12A, 12B, together forming a first polarization plate 12. Similarly, on both sides of a second polarization layer 11C are arranged support members 11A, 11B, together forming a second polarization plate 11.

Between the first substrate 16 and the second substrate 14 is arranged a blue phase liquid crystal layer 15. Near the blue phase liquid crystal layer 15 of at least one of the first substrate 16 and the second substrate 14, a group of matrix-driven electrodes having at least a pair of electrodes facing each pixel is provided. The electrodes can apply a horizontal electric field to the liquid crystal layer 15.

In FIG. 1A, a first optical phase compensation film 13 with birefringence is arranged between the second substrate 14 and the support member 11B supporting the second polarization layer 11C. For the support member 12B disposed between the first substrate 16 and the first polarization layer 12C, an almost optically isotropic material with no birefringence is used.

In FIG. 1B, on the other hand, a first optical phase compensation film 13 with birefringence is disposed between the first substrate 16 and the support member 12B supporting the first polarization layer 12C. For the support member 11B disposed between the second substrate 14 and the second polarization layer 11C, an almost optically isotropic material with no birefringence is used. Either of these structures can produce equal effects. Details of the first optical phase compensation film 13 including its optical characteristics will be described later.

The structure ranging from the first polarization plate 12 to the second polarization plate 11 is referred to as a liquid crystal display element 10. At the back of the liquid crystal display element 10 is arranged an illumination device 50. The illumination device 50 comprises lamps 51, a reflection plate 52 for reflecting light from the lamps and a diffusion plate 53 that diffuses light thrown from the lamps onto the liquid crystal display element 10.

Figure 17:
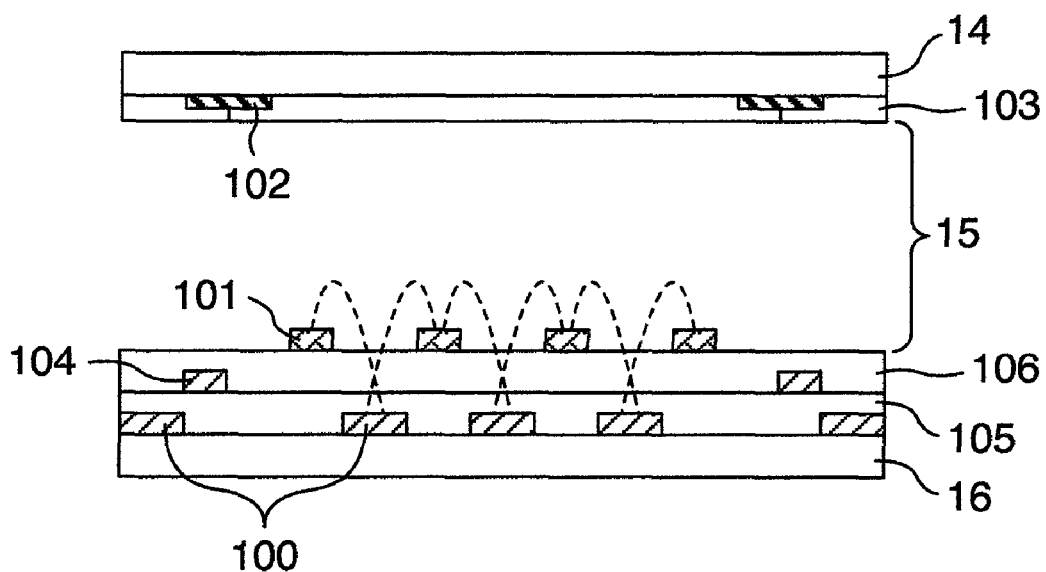
FIG. 17 shows a construction of a liquid crystal display device as one embodiment of this invention.
Figure 18:
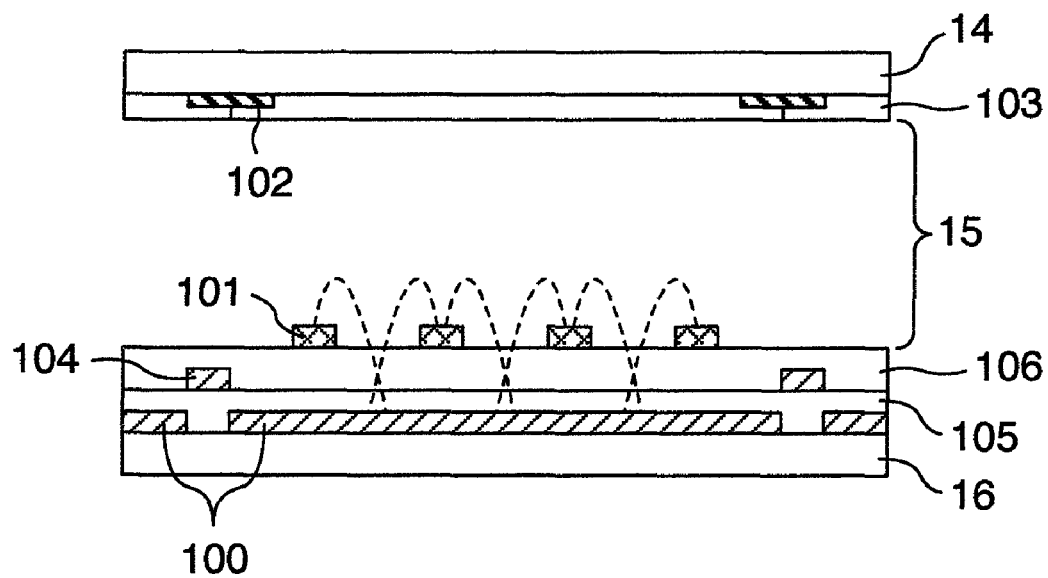
FIG. 18 shows a construction of a liquid crystal display device as one embodiment of this invention.

FIG. 17 and FIG. 18 show an example of detailed structure between the first substrate 16 and the second substrate 14 of FIG. 1.

In FIG. 17, on the first substrate 16 is arranged a comb-shaped common electrode 100, over which video signal lines 104 are disposed through an insulating film 105. Over the video signal lines 104 a comb-shaped pixel electrode 101 is disposed with a protective film 106 in between. On the second substrate 14 there are arranged color filters 103, one for each pixel, with a black matrix 102 arranged to separate individual pixels.

A potential difference between the common electrode 100 and the pixel electrode 101 is used to apply an electric field to the liquid crystal layer 15 to control transmissivity.

FIG. 18 differs from the structure of FIG. 17 in that the common electrode 100 is formed in a tabular shape. For the common electrode 100, a transparent electrode is used. This construction can improve an aperture ratio compared with the construction of FIG. 17.

Figure 6:
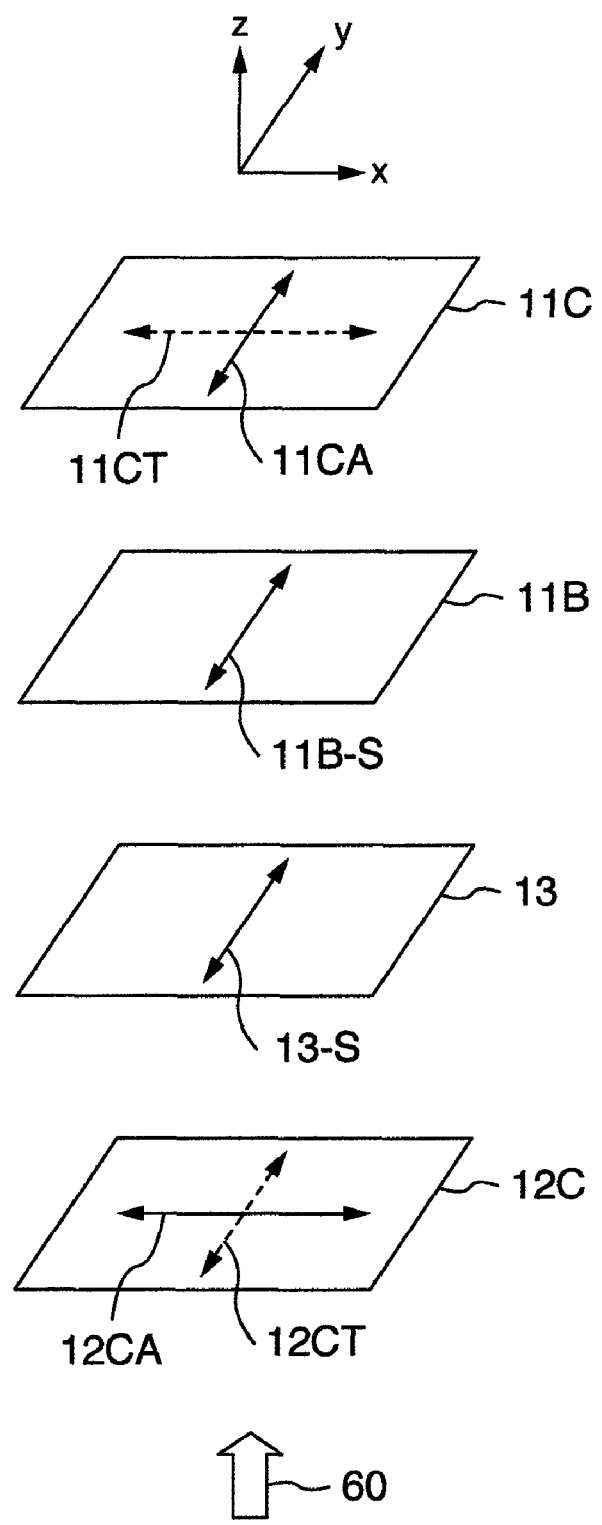
FIG. 6 is an optical configuration diagram for the liquid crystal display device of this invention.

Next, the optical configuration of FIG. 1A will be explained by referring to FIG. 6 and FIG. 8. FIG. 6 and FIG. 8 both show optical constructions between the first polarization layer 12C and the second polarization layer 11C of FIG. 1A. Here, since the almost optically isotropic support member 12B, the liquid crystal layer 15 formed of optically isotropic blue phase medium, the first substrate 16 and the second substrate 14 do not influence the optical characteristics, they can be eliminated in FIG. 6 and FIG. 8 in our discussion.

Thus, the only optical members in FIG. 6 and FIG. 8 that affect the viewing angle characteristic are the first polarization layer 12C, the first optical phase compensation film 13, the support member 11B for the second polarization layer, and the second polarization layer 11C.

In these figures, reference numbers 13-S and 11B-S represent lagging phase axes in the x-y plane of the first optical phase compensation film 13 and the second polarization layer support member 11B, respectively. Further, 11CA and 11CT represent the absorbing axis and the transmission axis of the second polarization layer 11C, respectively. 12CA and 12CT represent the absorbing axis and the transmission axis of the first polarization layer 12C, respectively.

In the configuration of FIG. 6, the lagging phase axis 13-S of the first optical phase compensation film 13 and the lagging phase axis 11B-S of the support member 11B are both almost at right angles (88-92 degrees) to an absorbing axis 12CA of the first polarization layer 12C.

In the configuration of FIG. 8, the lagging phase axis 13-S of the first optical phase compensation film 13 and the lagging phase axis 11B-S of the support member 11B are both almost parallel (−2 degrees to 2 degrees) to the absorbing axis 12CA of the first polarization layer 12C.

Figure 7A:
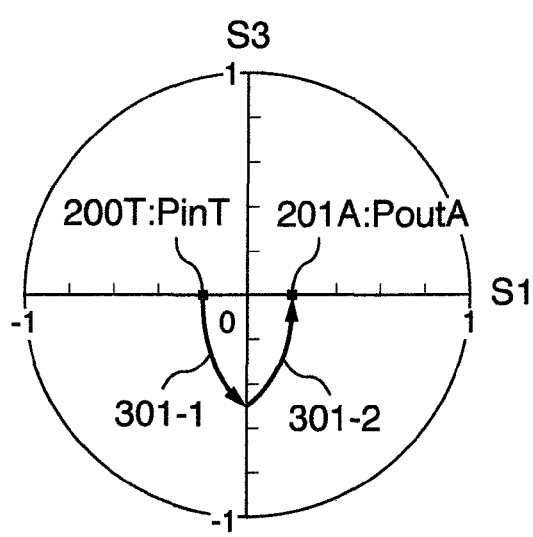
FIG. 7A is a Poincare sphere representation for explanation of the liquid crystal display device of this invention.
Figure 7B:
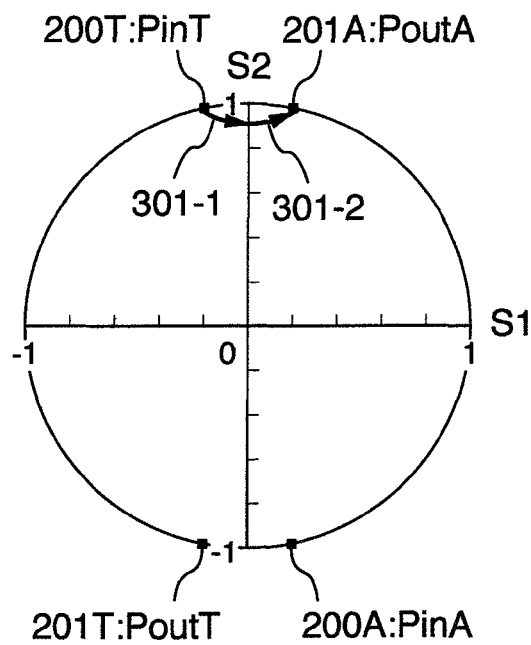
FIG. 7B is a Poincare sphere representation for explanation of the liquid crystal display device of this invention.

In the optical configuration of FIG. 6, for an ideal polarization state change, the Nz coefficient of the first optical phase compensation film 13 needs to be larger than 0.5 and the Nz coefficient of the support member 11B of the second polarization layer needs to be smaller than 0.5. In that case, the polarization state change is as shown in FIG. 7. In the figure, 301-1 indicates a change in polarization state caused by the first optical phase compensation film 13, and 301-2 indicates a change in polarization state caused by the support member 11B of the second polarization layer.

Figure 9A:
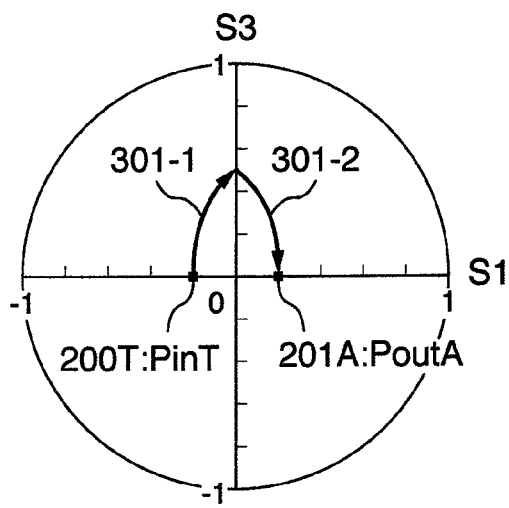
FIG. 9A is a Poincare sphere representation for explanation of the liquid crystal display device of this invention.
Figure 9B:
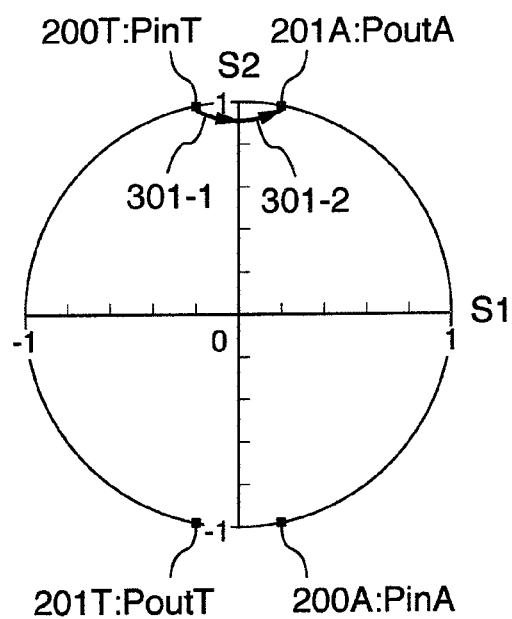
FIG. 9B is a Poincare sphere representation for explanation of the liquid crystal display device of this invention.

In the optical configuration of FIG. 8, for an ideal polarization state change, the Nz coefficient of the first optical phase compensation film 13 needs to be smaller than 0.5 and the Nz coefficient of the support member 11B of the second polarization layer needs to be larger than 0.5. In that case, the polarization state change is as shown in FIGS. 9A and 9B. In the figure, 301-1 indicates a change in polarization state caused by the first optical phase compensation film 13, and 301-2 indicates a change in polarization state caused by the support member 11B of the second polarization layer.

The similar consideration also applies to the configuration of FIG. 1B. In FIG. 1B, since the almost optically isotropic support member 11B, the liquid crystal layer 15 formed of the optically isotropic medium blue phase, the first substrate 16 and the second substrate 14 do not influence the optical characteristics, they can be omitted from the discussion.

In that case, in FIG. 6 and FIG. 8 if the first optical phase compensation film 13 is replaced with the support member 12B of the first polarization layer and the support member 11B of the second polarization layer is replaced with the first optical phase compensation film 13, the configuration of FIG. 1B can be examined by maintaining the axis arrangement.

That is, in the configuration of FIG. 1B, if the lagging phase axes of the support member 12B and the first optical phase compensation film 13 are almost vertical to the absorbing axis of the first polarization layer 12C, the Nz coefficient of the support member 12B needs to be larger than 0.5 and the Nz coefficient of the first optical phase compensation film 13 needs to be smaller than 0.5. Conversely, if the lagging phase axes of the support member 12B and the first optical phase compensation film 13 are almost parallel to the absorbing axis of the first polarization layer 12C, the Nz coefficient of the support member 12B needs to be smaller than 0.5 and the Nz coefficient of the first optical phase compensation film 13 needs to be larger than 0.5.

Since the liquid crystal layer 15 is isotropic as described above, FIG. 1A and FIG. 1B can be considered to be optically equivalent.

The similar effect can be produced by a 2-axis anisotropic birefringent medium. The principle for the polarization state change is the same as what is detailed in Y. Saitoh, "Optimum Film Compensation of Viewing Angle of Contrast in In-Plane-Switching-Mode Liquid Crystal Display," Jpn. J. Appl. Phys. Vo. 137, pp. 4822-4828, 1998. An optical configuration during a black mode is shown in FIG. 13. Here, denoted 18 is a birefringent medium with an Nz coefficient of 0.5 and a retardation of 270 nm. In this case, the polarization state change for an oblique viewing angle is as shown in FIGS. 5A and 5B. This allows for a brightness reduction in a black mode in a diagonal direction. Although in FIG. 13 the in-plane lagging phase axis 18-S of the birefringent medium 18 is parallel to the absorbing axis 12CA of the first polarization plate, the similar effect can also be produced if it is vertical.

Now, example embodiments will be shown below for further detailed explanation of the present invention. The embodiments that follow are given by way of example only and are not in any way intended to limit the present invention. The embodiments include a result of study that performed numerical computations based on an optical simulation using a 44-matrix method disclosed in D. W. Berreman, "Optical in Stratified and Anisotropic Media: 4×4-Matrix Formulation"

J. Opt. Soc. Am. volume 62, No. 4, pp. 502-510, 1972. In the simulation, we used spectral characteristics of 3-wavelength cold cathode tubes used in common backlights, spectral transmission characteristics of R, G, B color filters and spectral characteristics of 1224DU of Nitto Denko make as the polarization layer of the polarization plate. For chromatic dispersion of the optical phase compensation film, polycarbonate (PC), polystyrene and norbornene-type materials were used. Other materials may of course be used.

In the following embodiments, the words "vertical" and "90°" do not mean "perfectly vertical". The essence of the words is not affected if they are replaced with "almost vertical" or "88-90° in a smaller angle". The same also applies to the word "parallel".

Further, since in the embodiments a current general configuration is described, it is assumed that one birefringence function is realized for a single optical phase compensation film. However, the birefringence of each optical phase compensation film shown in the embodiments may also be realized by a combination of a plurality of optical phase compensation films. The optical phase compensation film and the polarization layer may be formed by coating a material to a substrate and performing an alignment layer treatment. In that case, however, the configuration shown in the embodiments may change. More specifically, there is a possibility that the polarization layer may be arranged on the liquid crystal layer side of the substrate. The polarization plate support member arranged on the side opposite the liquid crystal layer shown in the embodiments refers to the substrate, over which the polarization layer is formed, or all members formed between the substrate and the polarization layer. The polarization plate support member arranged on the liquid crystal layer side shown in the embodiments refers to nonexistent members or members that are formed between the polarization layer and the optical phase compensation film formed by coating. The present invention puts emphasis on the optical configuration, and if the optical configuration disclosed in this invention is realized, the effect of this invention can be realized irrespective of its physical configuration.

Embodiment 1

Figure 10:
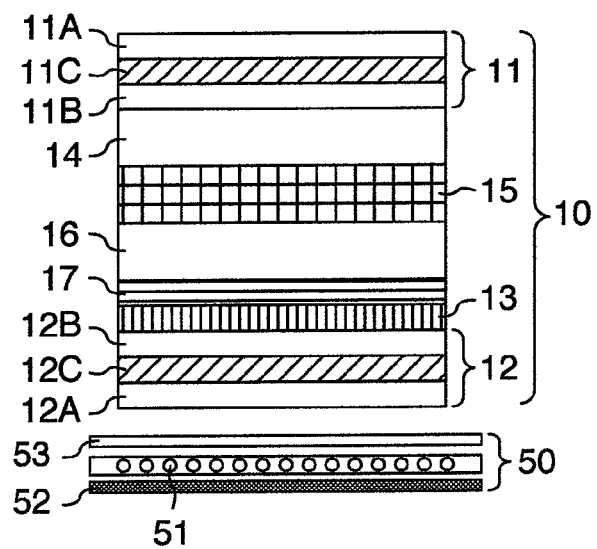
FIG. 10 shows a construction of a liquid crystal display device as one embodiment of this invention.
Figure 11:
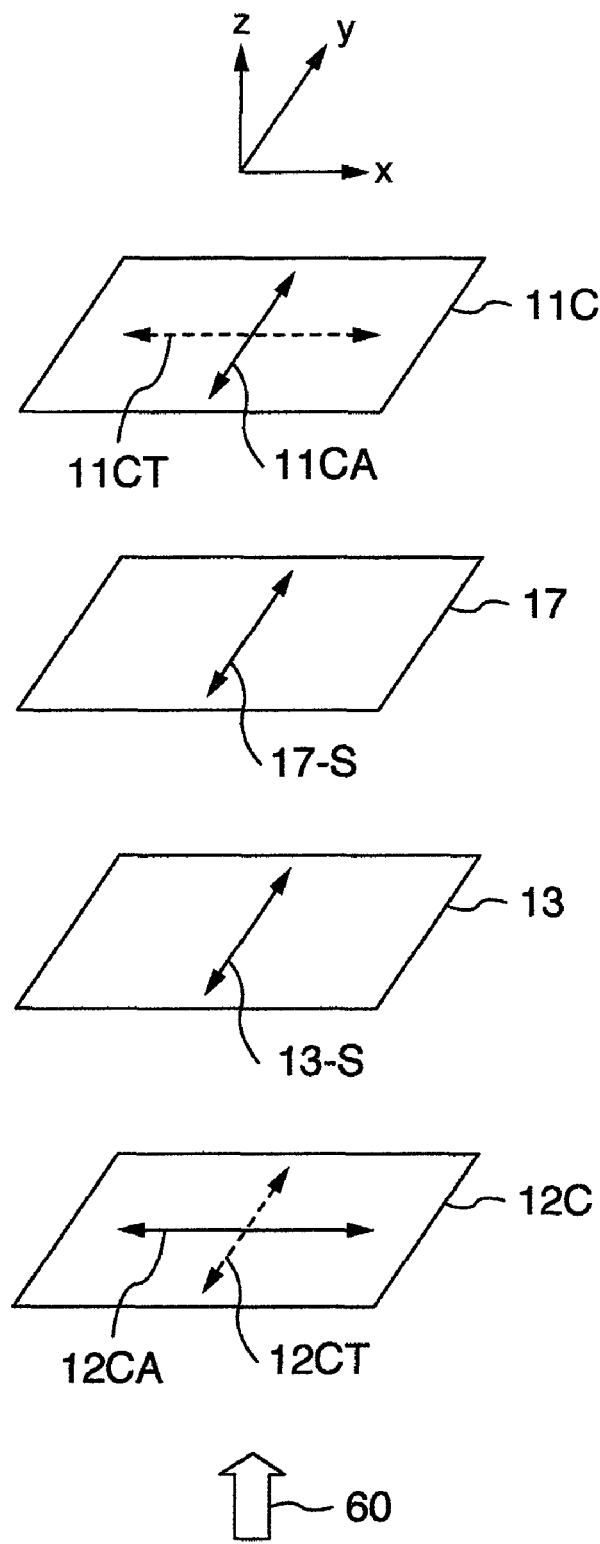
FIG. 11 is an optical configuration diagram for the liquid crystal display device of this invention.

The construction of this embodiment is shown in FIG. 10 and its optical configuration in FIG. 11. The optical configuration of FIG. 11 is optically equivalent to FIG. 6.

The display device shown in FIG. 10 differs from the laminated structure of FIG. 1B in that a second optical phase compensation film 17 is disposed between the first optical phase compensation film 13 and the first substrate 16. Further, the construction of this embodiment is characterized in that the support members 11B and 12B are optically isotropic and that two optical phase compensation films (the first optical phase compensation film 13 and the second optical phase compensation film 17) are used.

Eliminating from the laminated structure of FIG. 10 those members which do not influence the optical characteristics—the support member 12B, the support member 11B, the liquid crystal layer 15, the first substrate 16 and the second substrate 14—results in a construction of FIG. 11. In FIG. 11 the same explanation for FIG. 6 can also be applied. That is, if the retarded phase axes of the first optical phase compensation film 13 and the second optical phase compensation film 17 are perpendicular to the absorbing axis 12CA of the first polarization layer 12C, the Nz coefficient of the first optical phase compensation film 13 needs to be larger than 0.5 and the Nz coefficient of the second optical phase compensation film 17 needs to be smaller than 0.5.

In this embodiment, the Nz coefficient of the first optical phase compensation film 13 is 1.5 and the Nz coefficient of the second optical phase compensation film 17 is 0.0. The retardation of the first optical phase compensation film 13 is 50 nm and the retardation of the second optical phase compensation film 17 is 100 nm. The first optical phase compensation film 13 is formed of norbornene-type resin and the second optical phase compensation film 17 is formed of polycarbonate-type resin.

Figure 14:
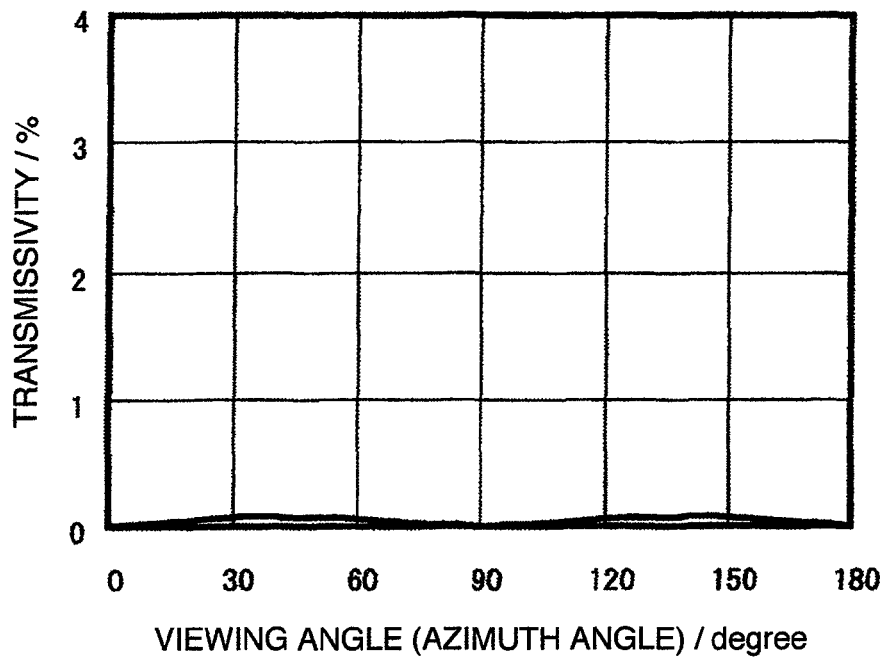
FIG. 14 is a characteristic diagram for explanation of effects of this invention.

A viewing angle characteristic obtained in this embodiment is shown in FIG. 14.

The abscissa represents a viewing angle (azimuth angle) when the display is viewed at a viewing angle (polar angle) of 60 degrees in black mode. The ordinate represents a retardation. That is, FIG. 14 shows a dependency of transmissivity on azimuth angle at a polar angle of 60 degrees during black mode.

Figure 15:
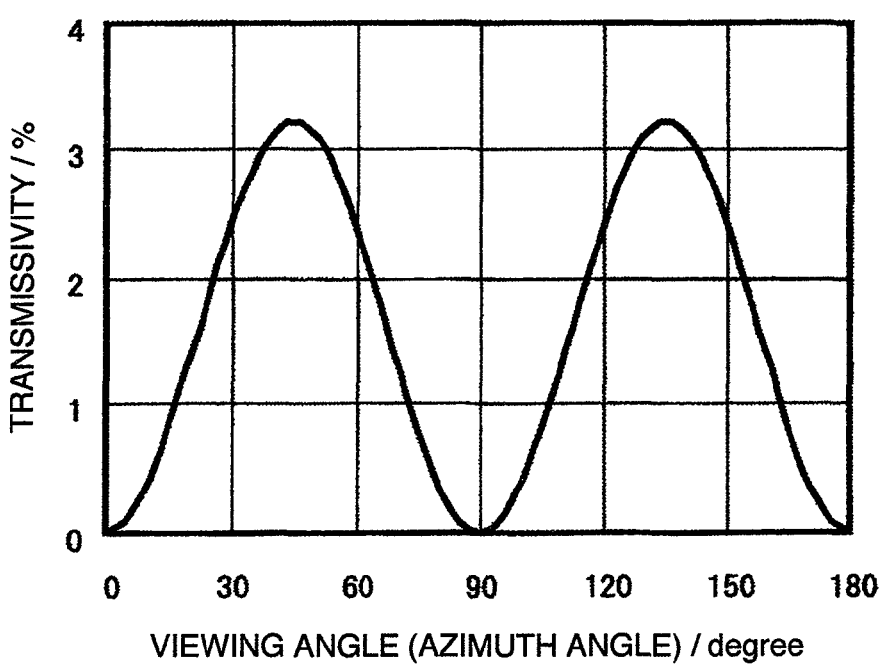
FIG. 15 is a characteristic diagram for explanation of effects of this invention.

For comparison, a viewing angle characteristic for the optical configuration of a general liquid crystal display device that does not apply the present invention is shown in FIG. 15. The generally used configuration whose characteristic is shown in FIG. 15 is a configuration which in FIGS. 1A and 1B has no first optical phase compensation film 13 and employs a general TAC (triacetylcellulose) film for the support members 11B and 12B. Comparison between FIG. 14 and FIG. 15 shows that this invention greatly improves the viewing angle characteristic during black mode.

Although this embodiment has considered a case where the retarded phase axes of the first optical phase compensation film 13 and the second optical phase compensation film 17 are perpendicular to the absorbing axis 12CA of the first polarization layer 12C, the explanation for FIG. 8 can be applied when the retarded phase axes are parallel to the absorbing axis 12CA. In that case, the Nz coefficient of the first optical phase compensation film 13 needs to be smaller than 0.5 and the Nz coefficient of the second optical phase compensation film 17 needs to be greater than 0.5.

Embodiment 2

Figure 16:
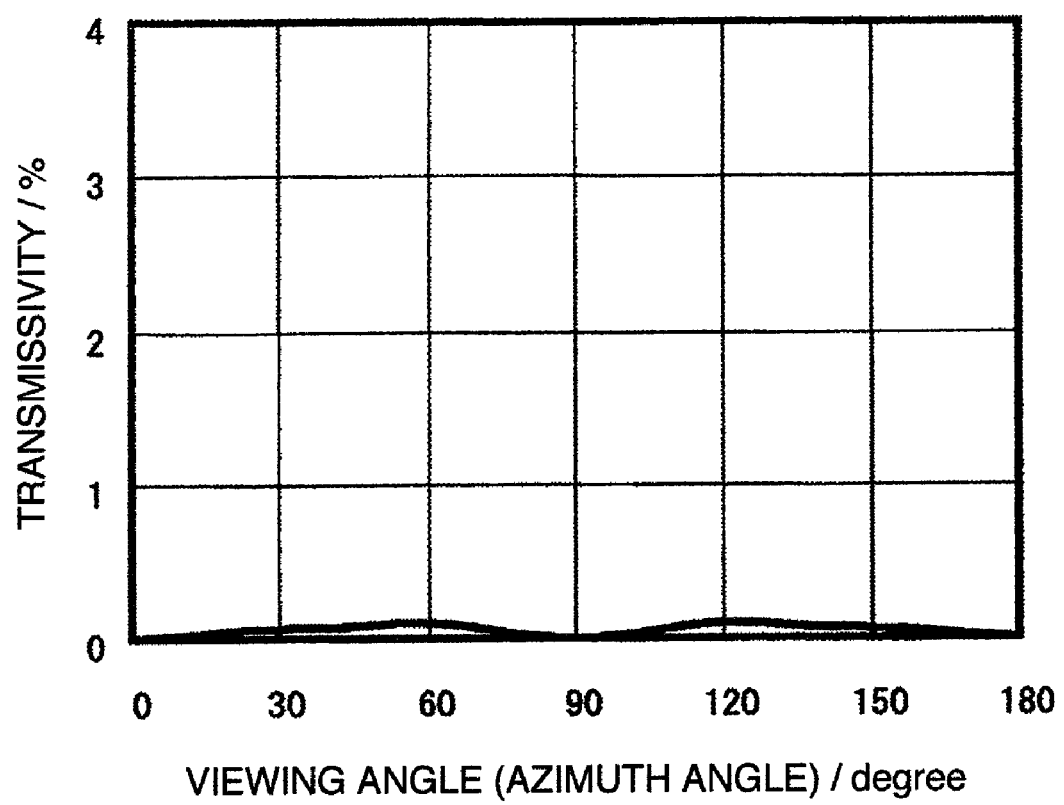
FIG. 16 is a characteristic diagram for explanation of effects of this invention.

The construction of this embodiment is shown in FIG. 1B and its optical configuration in FIG. 8. In this embodiment, a common TAC film is used for the support member 11B, and the support member 12B for the polarization plate is optically isotropic. The common TAC film has a very large Nz coefficient, much greater than 0.5. So, as the Nz coefficient of the first optical phase compensation film 13, a value of 0.3, smaller than 0.5, was chosen. Here, the TAC film has a very small in-plane phase difference and thus can be considered to be almost equivalent to a monoaxis anisotropic negative c-plate. Therefore, for the retarded phase axis direction of the TAC film, the effects of this invention can be fully produced also in other directions than the direction indicated by 11B-S in FIG. 6. The first optical phase compensation film 13 is formed mainly of polycarbonate. A viewing angle (azimuth angle) dependency of the transmittance at a viewing angle (polar angle) of 60 degrees in black mode is shown in FIG. 16.

Embodiment 3

Figure 12:
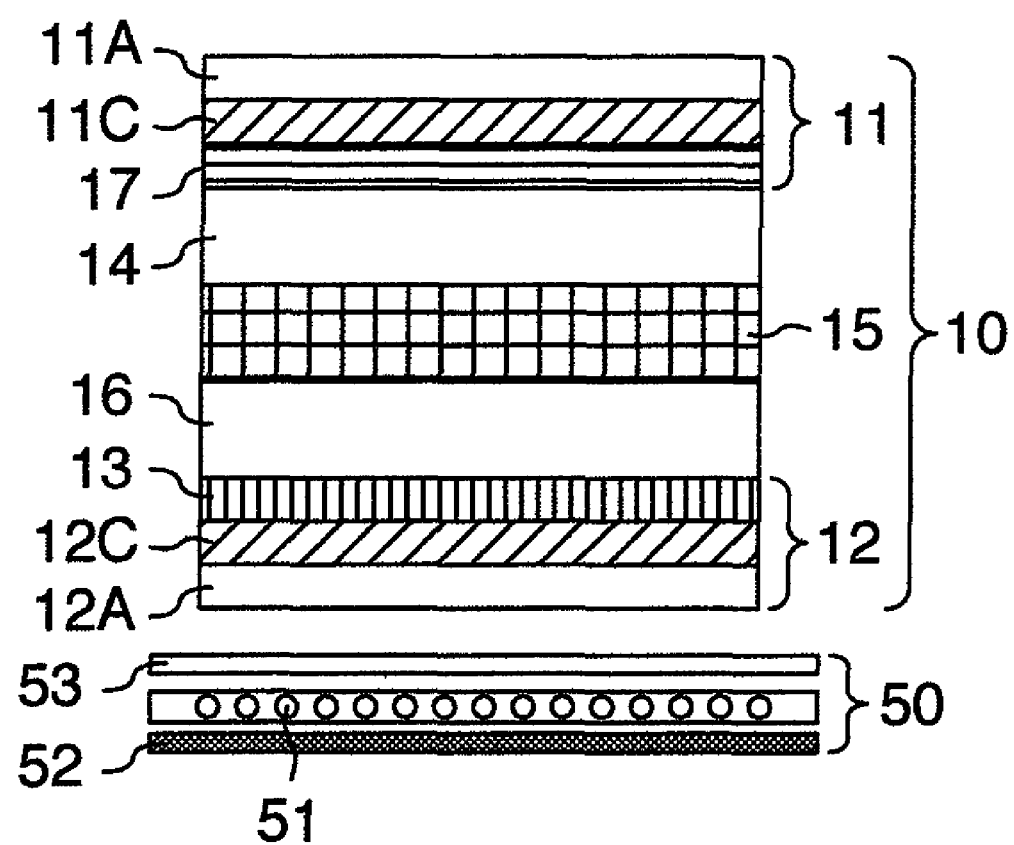
FIG. 12 shows a construction of a liquid crystal display device as one embodiment of this invention.

The construction of this embodiment is shown in FIG. 12 and its optical configuration in FIG. 8.

In the display device of FIG. 12, the laminated structure differs from that of FIG. 1B in that it has no support member 12B between the first optical phase compensation film 13 and the first polarization layer 12C and that the second optical phase compensation film 17, instead of the support member 11B, is arranged between the second substrate 14 and the second polarization layer 11C.

In this embodiment, the first optical phase compensation film 13 is formed of polycarbonate, serves as a support member for the first polarization layer 12C and has an Nz coefficient of 0.3. The second optical phase compensation film 17 is a TAC film generally used as a support member. The retarded phase axes of the first optical phase compensation film 13 and the second optical phase compensation film 17 are set parallel to the absorbing axis of the first polarization layer 12C. In at least one of the first and second substrates 16, 14, a matrix of electrodes to apply an in-plane electric field to the liquid crystal layer 15 is formed. In this embodiment, the comb-shaped electrode similar to the general IPS type is formed. This induces a birefringence equivalent to that of the IPS type in the liquid crystal layer 15 during white mode.

In this example, the first optical phase compensation film 13 (first birefringent medium) and the second optical phase compensation film 17 (second birefringent medium) do not adjoin each other. However, since the liquid crystal layer in black mode is optically isotropic, the liquid crystal layer 15 can be eliminated from the examination in the consideration of the optical characteristics. As a result, the optical characteristics of FIG. 12 can be represented by one that is obtained by replacing the support member 11B of FIG. 8 with the second optical phase compensation film 17.

In this case, the Nz coefficient of the first optical phase compensation film 13 needs to be smaller than 0.5 and the Nz coefficient of the second optical phase compensation film 17 needs to be greater than 0.5.

Therefore, by setting the retardation of the optical phase compensation film to 200 nm, the viewing angle characteristic during black mode is equivalent to that of embodiment 2, as shown in FIG. 16.

In this embodiment, it is also possible to improve the transmissivity at an oblique viewing angle during white mode. Our simulation has found that this embodiment can improve the minimum transmissivity for all viewing angles during white mode by approximately 1%, when compared with a case where the first optical phase compensation film 13 (the first birefringent medium) and the second optical phase compensation film 17 (second birefringent medium) adjoin. Therefore, a brightness reduction at an oblique viewing angle during black mode and a brightness increase at an oblique viewing angle during white mode can be achieved at the same time.

This embodiment has described a case in which the retarded phase axes of the first optical phase compensation film 13 and the second optical phase compensation film 17 are parallel to the absorbing axis 12CA of the first polarization layer 12C. When they are perpendicular to the absorbing axis, the explanation for FIG. 6 applies. In that case, the Nz coefficient of the first optical phase compensation film 13 needs to be greater than 0.5 and the Nz coefficient of the second optical phase compensation film 17 needs to be smaller than 0.5.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display device comprising:
   a first substrate having a first polarization layer on a light incident side;
   a second substrate having a second polarization layer on a light outgoing side;
   a liquid crystal layer disposed between said first substrate and said second substrate;
   a first birefringent film disposed between said first polarization layer and said second polarization layer;
   a second birefringent film disposed between said first birefringent film and said second polarization layer; and
   pixel electrodes and a common electrode arranged on one of said first substrate and said second substrate;
   wherein said first birefringement film is disposed between said first polarization layer and said first substrate, and said second birefringent film is disposed between said second polarization layer and said second substrate;
   wherein an absorbing axis of said first polarization layer and an absorbing axis of said second polarization layer form an angle of from 88 degrees to 92 degrees;
   wherein said liquid crystal layer has a property that a refractive index anisotropy is induced by an electric field applied between said pixel electrodes and said common electrode;
   wherein in-plane retarded phase axes of said first birefringent film and said second birefringent film form an angle of from −2 degrees to 2 degrees with the absorbing axis of said first polarization layer; and
   wherein said first birefringent film has an Nz coefficient smaller than 0.5 and said second birefringent film has an Nz coefficient greater than 0.5.

2. A liquid crystal display device according to claim 1, wherein at least one of said first birefringent film and said second birefringent film constitutes a support member for said first polarization layer and said second polarization layer.

3. A liquid crystal display device according to claim 1, wherein said liquid crystal layer has equal refractive indices in three dimensions when no voltage is applied.

4. A liquid crystal display device according to claim 1, wherein said first birefringent film consists of triacetylcellulose.

5. A liquid crystal display device according to claim 1, wherein at least one of said first birefringent medium and said second birefringent medium is anisotropic monoaxis medium.

6. A liquid crystal display device according to claim 1, wherein said pixel electrodes and said common electrode are arranged over said first substrate and are both formed in a comb shape.

7. A liquid crystal display device according to claim 1, wherein said pixel electrodes and said common electrode are arranged over said first substrate, and wherein one of said pixel electrodes and said common electrode is formed in a comb shape and the other is formed in a tabular shape.

8. A liquid crystal display device comprising:
   a first substrate having a first polarization layer on a light incident side;
   a second substrate having a second polarization layer on a light outgoing side;
   a liquid crystal layer disposed between said first substrate and said second substrate;
   a first birefringent film disposed between said first polarization layer and said second polarization layer;
   a second birefringent film disposed between said first birefringent film and said second polarization layer; and
   pixel electrodes and a common electrode arranged on one of said first substrate and said second substrate;
   wherein said first birefringent film is disposed between said first polarization layer and said first substrate, and said second birefringent film is disposed between said second polarization layer and said second substrate;

wherein said first birefringent film and said first polarization layer are adjacent each other, and said second birefringent film and said second polarization layer are adjacent each other;

wherein an absorbing axis of said first polarization layer and an absorbing axis of said second polarization layer form an angle of from 88 degrees to 92 degrees;

wherein said liquid crystal layer has a property that a refractive index anisotropy is induced by an electric field applied between said pixel electrodes and said common electrode;

wherein in-plane retarded phase axes of said first birefringent film and said second birefringent film form an angle of from −2 degrees to 2 degrees with the absorbing axis of said first polarization layer; and wherein said first birefringent film has an Nz coefficient smaller than 0.5 and said second birefringent film has an Nz coefficient greater than 0.5.

* * * * *